UNITED STATES PATENT OFFICE.

OTTO L. MULOT, OF LONG ISLAND CITY, NEW YORK.

MEDICINAL COMPOSITION.

SPECIFICATION forming part of Letters Patent No. 496,694, dated May 2, 1893.

Application filed October 6, 1892. Serial No. 448,053. (No specimens.)

*To all whom it may concern:*

Be it known that I, OTTO L. MULOT, a citizen of the United States, residing at Long Island City, in the county of Queens and State of New York, have invented a new and useful Composition of Matter and Process of Preparing the Same, of which the following is a specification.

The composition consists of the following ingredients combined in substantially the proportions and in the manner stated, to wit: Oil of turpentine, eight ounces; powdered juniper berries, eight ounces; white oil of amber, one ounce; powdered aloes (socot.), four ounces; powdered gum myrrh, four ounces; powdered gum mastic, two ounces; flowers of sulphur, four ounces; powdered gum olibanum, two ounces; Spanish saffron, one-half ounce; powdered cubebs, two drams; powdered cardamom seed, two drams; powdered angelica root, two drams; purified alcohol, three quarts; sherry wine, three quarts.

The composition is combined and prepared in the following way: The flowers of sulphur, oil of turpentine and white oil of amber are separately mingled, and the other ingredients, with the exception of the sherry wine, are mingled and macerated for about three weeks, the mixture being meanwhile agitated occasionally. After the maceration the mixture of sulphur, turpentine and amber is added and the whole left for a week, after which the mass is distilled. After distillation the distillate is subjected to electrolysis, a current of about thirty-five volts being passed through each quart of the mixture, for, say fifteen minutes. The electrolysis resolves the water in the distillate into its elementary constituents, hydrogen and oxygen, which are thrown off at the poles of the battery, and a stronger solution is consequently produced and the floating oil is caused to unite thoroughly with the distillate. After the electrolysis, the mixture is diluted with three quarts of sherry wine, but the wine may be added before electrolysis, in which case it will be affected similarly to the water.

The preparation or composition described is used for the blood, to increase the healthy tone and natural action of the body, also to stimulate sluggish circulation and remove poisonous substances from the blood. This it does by increasing the action of the kidneys and skin. It also destroys and removes intestinal parasites.

The medicine is also used for other complaints which it is not necessary to specify, and it is used externally and internally; when used externally it is simply rubbed upon and into the skin, and when used internally it is taken in doses of from one teaspoonful to a tablespoonful for adults, and is given two or three times a day. For children, one-half a teaspoonful is given for a dose and is administered three or four times a day.

What I claim, and desire to secure by Letters Patent of the United States, is—

1. The herein-described composition of matter for a medicine, being an electrolyzed distillate from a mixture of oil of turpentine, juniper berries, white oil of amber, aloes, gum myrrh, gum mastic, flowers of sulphur, gum olibanum, Spanish saffron, cubebs, cardamom seed, angelica root, sufficient alcohol for a preservative, and a dilution of sherry wine, all combined in substantially the proportions stated.

2. The herein-described process of preparing the within-named composition, which consists in mingling and macerating the juniper berries, aloes, gum myrrh, gum mastic, gum olibanum, Spanish saffron, cubebs, cardamom seed, angelica root and alcohol, mingling flowers of sulphur, oil of turpentine, white oil of amber, combining the two products after the maceration of the first, distilling the combined product, subjecting the distillate to electrolysis, and then diluting with wine.

OTTO L. MULOT.

Witnesses:
WARREN B. HUTCHINSON,
C. SEDGWICK.